Sept. 8, 1931.  D. A. WHITSON  1,822,183
SOUND PHOTOGRAPHY SYSTEM
Filed July 10, 1928   3 Sheets-Sheet 1

INVENTOR
Delmar A. Whitson
BY
John Flam
HIS ATTORNEY

Sept. 8, 1931.   D. A. WHITSON   1,822,183
SOUND PHOTOGRAPHY SYSTEM
Filed July 10, 1928   3 Sheets-Sheet 2

INVENTOR
Delmar A. Whitson
BY
John Flam
HIS ATTORNEY

Sept. 8, 1931.      D. A. WHITSON      1,822,183
SOUND PHOTOGRAPHY SYSTEM
Filed July 10, 1928      3 Sheets-Sheet 3

INVENTOR
Delmar A. Whitson
BY John Flam
HIS ATTORNEY

Patented Sept. 8, 1931

1,822,183

UNITED STATES PATENT OFFICE

DELMAR A. WHITSON, OF LOS ANGELES, CALIFORNIA, ASSIGNOR TO WHITSON PHOTO-PHONE CORPORATION, OF LOS ANGELES, CALIFORNIA, A CORPORATION OF NEVADA

SOUND PHOTOGRAPHY SYSTEM

Application filed July 10, 1928. Serial No. 291,547.

This invention relates to sound recording and reproduction, and especially to a system that utilizes radiant energy, such as light, as a medium for recording and for reproducing the sound.

In such systems, it is now known that a strip rendered sensitive to light can be passed across the field of illumination of a source of light, and that a sound record can be "photographed" on the strip by varying the light intensity in accordance with the sound impulses and while the sensitive strip is in motion. In this way, when the strip is developed, variations in the light record on the strip correspond to the sound inflections. Conversely, by causing such a record to vary the intensity of light (as by passing the light through the strip, if it be of the transparent type, or by reflecting light from its surface if the strip is opaque), it is possible to affect a light responsive system so as to cause variations in an electric circuit corresponding to the original sound impulses; and these variations in the electric circuit can in turn be used to affect a loud speaker or the like.

In recording and reproducing sound by the aid of such a system, the strip is fed past a narrow opening through which the light shines, and the width of the beam must be very small, so that all the extremely rapid variations in luminosity required to reproduce and record sound properly, find their accurate counterpart in the strip record. In the past, this was accomplished by providing an extremely narrow iris opening of the order of one of two thousandths of an inch. The film or strip was passed directly over this opening, with the edges of the opening in contact with the film or strip.

Such a mechanical arrangement is disadvantageous. The narrow opening quickly clogs up with foreign matter, such as fine dust particles, and the reproduction, if not entirely lost, is very materially interfered with. While this difficulty has been met somewhat, by filling the slot with a transparent solid, the most serious drawback is the dirt and foreign matter catching or lodging at the edges of the slot-holders, which are perpendicular to the travel of the film; and causing excessive scratching of the "sound path", and materially damaging the record.

It is one of the objects of my invention to provide an arrangement whereby these iris difficulties are overcome.

I attain this result, both for recording and reproduction, by making it possible to use a comparatively wide opening, whereby the danger of clogging or obstructing it is obviated; and yet only a very narrow light beam is utilized, so that the ultimate result is the same as if a very narrow opening were used. The further advantage is obtained that the film or strip does not contact with any edges of a narrow opening; but instead it extends over a relatively large opening that cannot collect any dust wiped off from the film as it moves past the opening.

My invention possesses many other advantages, and has other objects which may be made more easily apparent from a consideration of several embodiments of my invention. For this purpose I have shown a few forms in the drawings accompanying and forming part of the present specification. I shall now proceed to describe these forms in detail, which illustrate the general principles of my invention; but it is to be understood that this detailed description is not to be taken in a limiting sense, since the scope of my invention is best defined by the appended claim.

Referring to the drawings.

Figure 1:
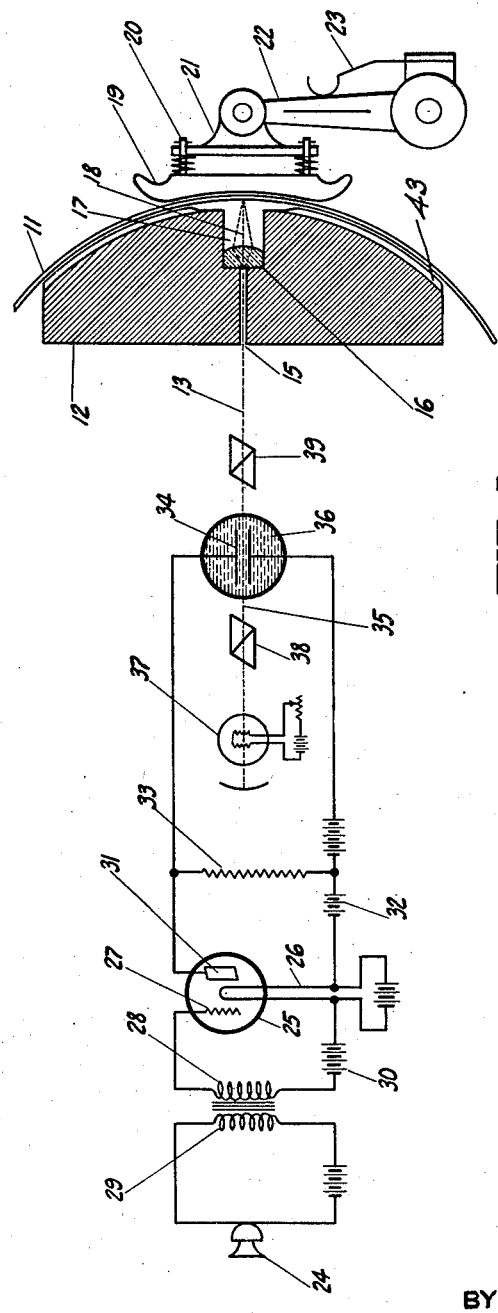
Figure 1 is a diagrammatic view of a system for recording sounds, in which my invention is embodied.

In Fig. 1, I show a sensitive film 11 that can be moved with respect to a stationary guiding block 12 and thereby to be subjected to varying light impulses. The face of the block 12 that contacts with film 11 is shown as provided with a pair of bearing shoes 43, straddling the record bearing portion 44 of a film 45; but obviously it can be made flat or concave if desired. Any appropriate scheme can be used to move the film 11 with respect to guide block 11, as for example, the usual sprocket arrangement 46 engaging apertures in the edges of the film.

Figure 3:
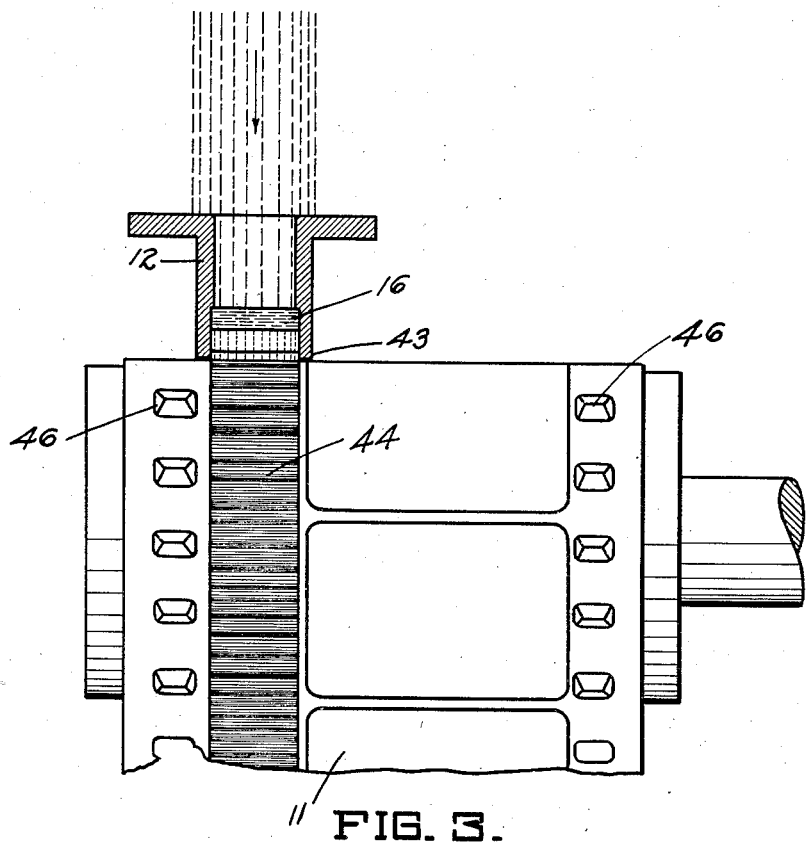
Fig. 3 shows a fragment of a film record 90 made by the apparatus, together with a sectional view of the slot arrangement.

A light ray 13 is arranged to affect the sensitive film 11. This ray, as will be described hereinafter, has its intensity varied in accordance with the sounds to be recorded. This intensity variation affects the film 11 as it is moved, so as to produce a "variable density" record, visible after film 11 is developed, in the form of closely spaced lines 14 of variable thickness. It is the important function of my present invention to ensure that the radiations of light shall accurately affect the film 11, for sound recording; or vice versa, that such a film record as shown in Fig. 3 shall accurately affect a beam of radiations, for sound reproduction.

For this purpose, beam or ray 13 passes through an opening 15 in block 12, and also through a lens system having a focus arranged exactly at the sensitive surface of film 11. The lens system is shown in this instance as a plano-convex cylindrical lens 16, disposed in a wide slot 17 in block 12, and spaced a considerable distance from film 11. It is apparent that the lens 16 converges the ray 13 to a very thin line, the intensity of which depends upon the intensity of the ray. It is also seen that opening 15 can be made very narrow, of the order of a few thousandths of an inch, so that at the focus of lens 16 at the film 11 there will be a very thin image of the slot 15. Since lens 16 is placed in the bottom of slot 17, diffraction from the sides or edges of the slot is corrected if not altogether prevented; and no extraneous illumination can reach the film 11. At the same time, film 11 extends over a wide slot, or opening such as 17, and there is thus no danger of the film carrying so much dust into the slot as to clog it up or in any way to prevent the refracted ray 18 from reaching the sensitized surface. Due to the use of the straddling shoes 43, the sound record on film 11 does not at all contact with the slot edges.

I also show in a general way, a device for holding the film 11 in contact with shoes 43. This can comprise a spring pressed shoe 19, having guide pins 20 in an arm 21 of a pivoted lever 22, which in turn is spring pressed toward shoes 43 as by flat spring 23.

The intensity of ray 13 can be varied in accordance with sound variations, by any well known scheme. For example, a microphone 24 or other sound impulse transmitter can be arranged to affect the input side of an electronic amplifier 25. This input side includes the electronic emission electrode 26 in the form of a heated filament, and a control electrode or grid 27, for varying the flow of electrons from filament 26 in accordance with the fluctuations of the electromotive force across a secondary 28 of a transformer. This transformer has its primary 29 connected in the microphone circuit. A grid bias battery 30 can be used to impress a negative potential on grid 27, for causing the amplifier 25 to operate between desired limits of its characteristic.

The output circuit includes a plate electrode or anode 31 which is kept at a potential positive with respect to filament 26, as by the aid of a battery 32. Due to this positive bias, the electrons from filament 26 are attracted to the plate 31, and form the space current flow. As this intensity of flow varies in response to the sound impulses impressed on the microphone 24, there is a corresponding amplified potential drop across a resistance 33 included in the output circuit.

Further stages of amplification can be provided if desired. The amplified potential variations existing across resistance 33 can be impressed for example on opposite plates of a condenser 34, so as to vary the electrostatic field therein. It has been found that such variations in the electrostatic field can affect the plane of polarization of a polarized beam such as 35. The plates can be encased in a liquid 36 for supporting the rotation of the plane of polarization. The ray 35 emanates from a source of light such as an electric lamp 37, and is polarized by a Nicoll prism 38. An analyzer prism 39 is placed in the path of the ray after it is acted on by the condenser 34; the plane of polarization of the analyzer is at an angle to that of prism 38, so that as the plane of light polarization of ray 35 varies, more or less of it is permitted to pass through the analyzer 39, the amount being determined by the relative positions of the plane of the ray, and of the plane of polarization of the analyzer 39. All this is now well understood, and no further detailed explanation is needed for the action of this type of sound recorder. It is sufficient to note that the intensity of the ray 13 is modulated by rotation of the plane of polarization of the ray in advance of a polarizer crystal acting as an analyzer.

The mode of operation of the system is apparent from the foregoing. The block 12 with the aperture slot 15 acts as a baffle to permit only a narrow beam of light to pass through lens 16. This lens in turn focuses the beam to a very narrow line on film 11.

Figure 2:
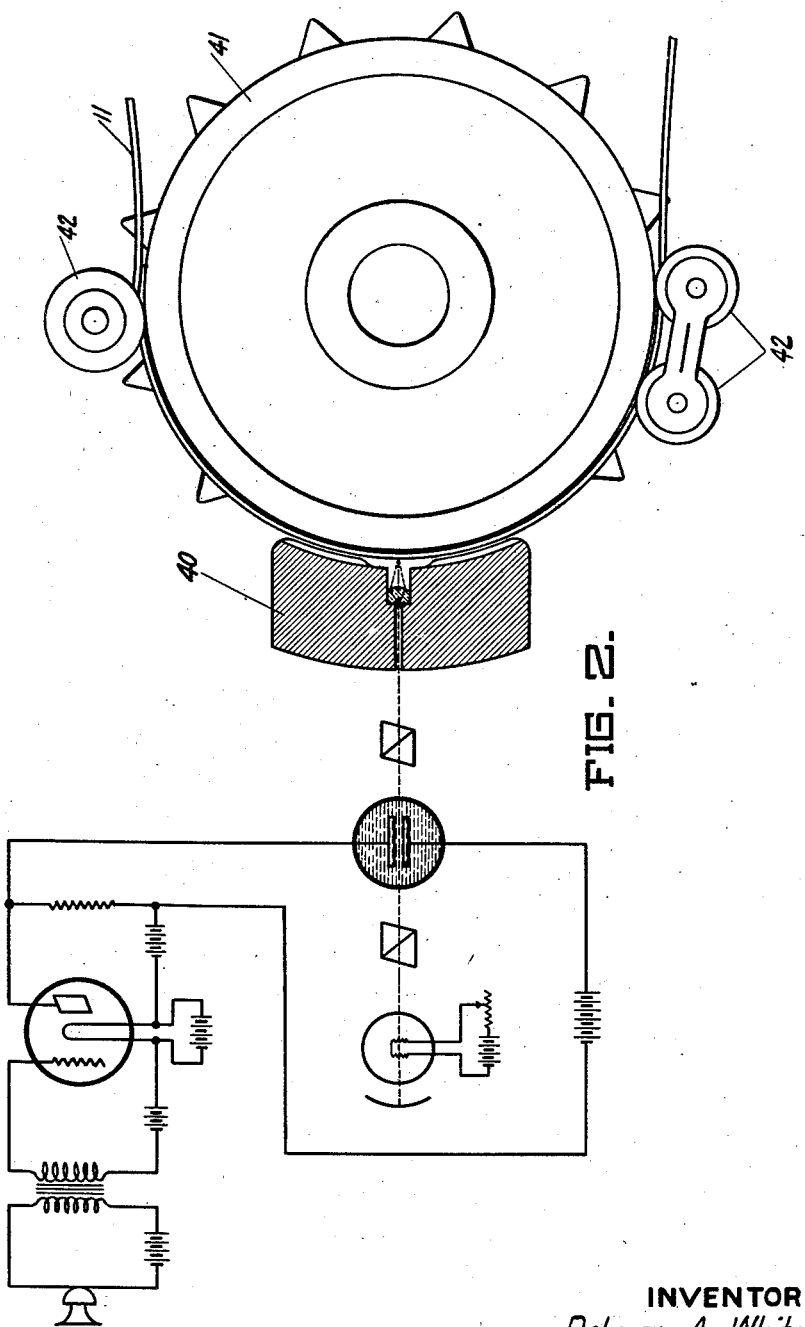
Fig. 2 is a diagram of a different form of the recorder shown in Fig. 1.

In Fig. 2 I show a system substantially like Fig. 1, except for the details of the guide block and drive mechanism for the film 11. In this case, the film 11 is wound around a large sprocket wheel 41 that can act as the drive for the film. Idlers 42 can be used to keep the film 11 in engagement with the sprocket. Guide block 40 has a convex face conforming with the circumference of sprocket 41; but otherwise it acts in a manner similar to that already disclosed in connection with Fig. 1.

I claim:

In a slot defining device for a sound photography system, a guide block having a wide slot and a communicating narrow slot, means whereby a sound record strip can be passed over the wide slot, and a lens in the bottom of the wide slot and in contact with the sides and bottom of said slot for focusing radiations that pass through the slots on the strip, said strip being spaced from the lens.

In testimony whereof I have hereunto set my hand.

DELMAR A. WHITSON.